United States Patent [19]

Müller

[11] E Re. 28,487

[45] Reissued July 22, 1975

[54] CRIMPED FLAT MATERIAL FOR FILTER PLUGS

[75] Inventor: Paul Adolf Müller, Triesenberg, Liechtenstein

[73] Assignee: Celfil Company Establishmant, Vaduz, Liechtenstein

[22] Filed: Jan. 24, 1968

[21] Appl. No.: 700,300

Related U.S. Patent Documents

Reissue of:

[64] Patent No.: 2,995,481
Issued: Aug. 8, 1961
Appl. No.: 502,016
Filed: Apr. 18, 1955

U.S. Applications:

[63] Continuation of Ser. No. 422,872, Nov. 2, 1964, abandoned, which is a continuation of Ser. No. 254,039, Jan. 21, 1963, abandoned, which is a continuation of Ser. No. 173,611, Feb. 9, 1962, abandoned.

[30] Foreign Application Priority Data

Feb. 15, 1955 Switzerland.....161,102/55

[52] U.S. Cl...... 131/261 B; 161/180; 93/1

[51] Int. Cl...... A24d 01/04

[58] Field of Search ..... 131/10.3, 10.5, 10.7, 10.9, 131/261–264

[56] References Cited

UNITED STATES PATENTS

| | | | |
|---|---|---|---|
| 1,929,008 | 10/1933 | Wells | 154/55 X |
| 1,980,563 | 11/1934 | Walker | 131/10 |
| 2,001,023 | 5/1935 | Howell et al. | 154/55 |
| 2,033,867 | 3/1936 | Segal | 131/10 |
| 2,075,386 | 3/1937 | Woodford | 154/55 X |
| 2,113,431 | 4/1938 | Milliken | 154/46 PF |
| 2,161,092 | 6/1939 | Rowe | 154/30 |
| 2,164,702 | 7/1939 | Davidson | 154/30 X |
| 2,224,713 | 12/1940 | Rowe et al. | 154/55 |
| 2,494,334 | 1/1950 | Dorst | 154/30 |
| 2,502,112 | 3/1950 | Walker | 154/33.05 |
| 2,834,809 | 5/1958 | Schutte et al. | 154/30 |
| 2,847,086 | 8/1958 | Muller | 131/10 X |
| 2,849,932 | 9/1958 | Marogg | 93/1 |
| 2,954,036 | 9/1960 | Schur et al. | 131/208 |

FOREIGN PATENTS OR APPLICATIONS

| | | | |
|---|---|---|---|
| 265,824 | 3/1950 | Switzerland | |
| 420,464 | 12/1934 | United Kingdom | 131/208 |

*Primary Examiner*—Melvin D. Rein
*Attorney, Agent, or Firm*—Cushman, Darby & Cushman

[57] ABSTRACT

*A cigarette filter plug is disclosed which is made from a consolidated sheet or strip of paper. The paper sheet is longitudinally corrugated and stretched in such manner and to such an extent that the paper is partially pulled apart transversely of the sheet and manifests tears as well as outwardly projecting paper fibers directed in a haphazard relationship.*

12 Claims, 13 Drawing Figures

2 Sheets-Sheet 1
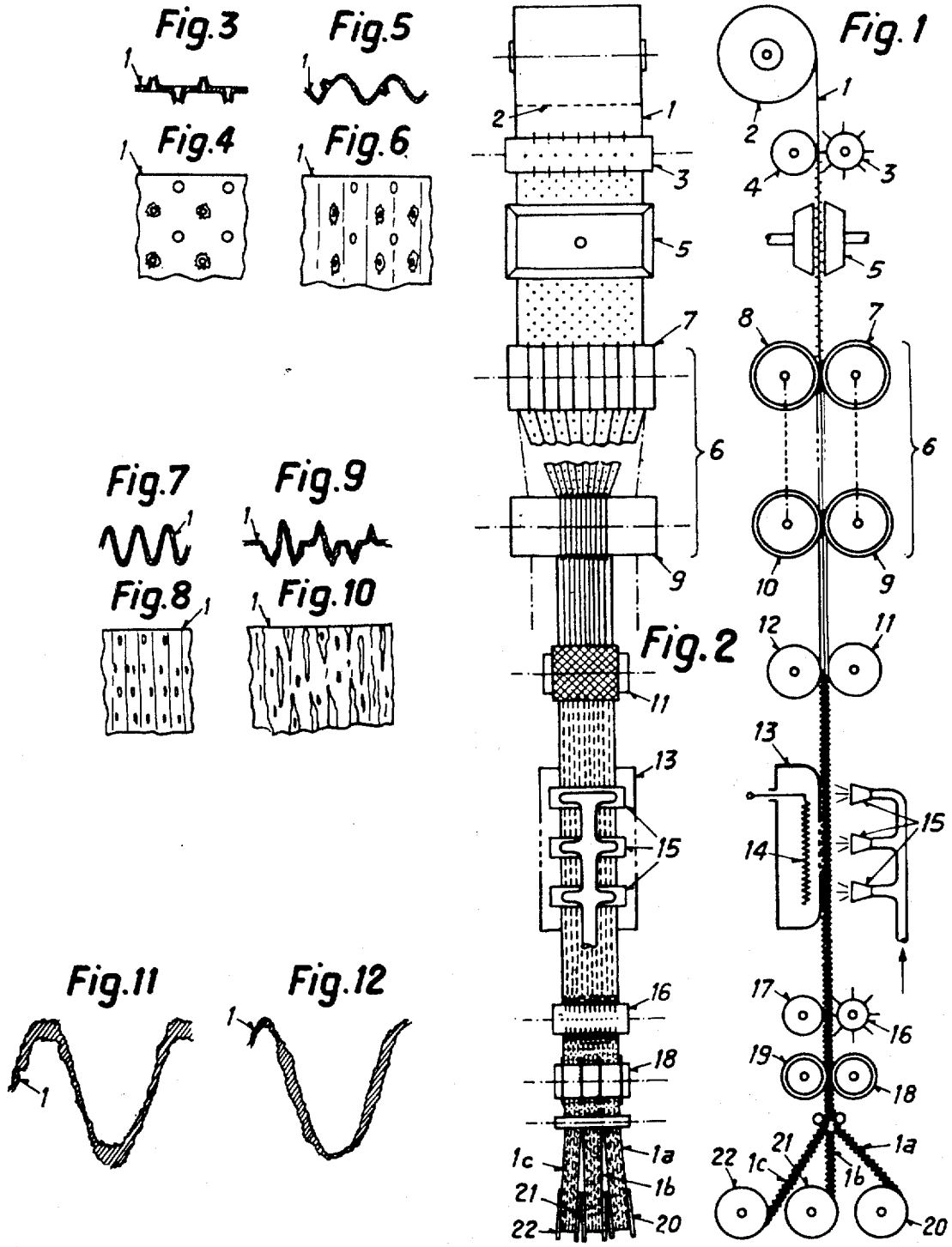

INVENTOR
PAUL A. MULLER

BY Cushman, Darby & Cushman
ATTORNEYS

CRIMPED FLAT MATERIAL FOR FILTER PLUGS

Matter enclosed in heavy brackets [ ] appears in the original patent but forms no part of this reissue specification; matter printed in italics indicates the additions made by reissue.

---

[ The present invention relates to crimped, i.e., grooved, flat material, particularly crimped paper webs for smoke filters. This application is a continuation-in-part of my copending application Ser. No. 447,478, filed Aug. 3, 1954, now U.S. Pat. No. 2,847,086, granted Aug. 12, 1958. ]

*This application for reissue is a continuation of my application for reissue Ser. No. 422,872, filed Nov. 2, 1964, now abandoned, which was a continuation of my application for reissue Ser. No. 254,039, filed Jan. 21, 1963, now abandoned, which was a continuation of my application for reissue Ser. No. 173,611, filed Feb. 9, 1962, now abandoned.*

*My original application Ser. No. 502,016, filed Apr. 18, 1955, was a continuation-in-part of my then copending application Ser. No. 447,478, filed Aug. 3, 1954, now U.S. Pat. No. 2,847,086, granted Aug. 12, 1958.*

*The present invention relates to crimped, i.e. grooved, flat material, particularly crimped paper webs, for smoke filters.*

Crimped papers are already known and, besides other purposes, are used to an important extent for the manufacture of filters for tobacco, particularly for cigarettes. Since, with such filters, flat webs of paper have to be shaped into cylindrical plugs, the paper used must have only a slight rigidity at least in one direction. A noncrimped web of paper would, on being compressed into a cylindrical cord, have irregular folds and randomly distributed bulges, which would lead to an irregular web cross-section with hollow spaces and unconnected ducts; that is to say, the result would be a structure completely unsuited for filtering purposes. Crimped paper, on the other hand, does not have these disadvantages and for this reason paper filter plugs are almost exclusively made with such material.

The crimping of the paper web, however, also facilitates the mechanical manufacture of such filter plugs and, furthermore, ensures that they will have the necessary porosity.

Crimped paper has so far been produced almost exclusively by a generally known method in which an endless damp web of paper runs on to a heated cylinder, dries there to a certain extent and is peeled off by a blunt scraper, the previously smooth paper web being upset in its direction of travel and provided with cross folds. Thus, the material is compressed and the crimped web of paper is always heavier per unit of length than the previously smooth web, the increase in weight being proportionate to the so-called crimping ratio. If, for instance, the originally smooth web of paper is worked into crimped paper with a crimping ratio of 3:1, a unit of length of the final product can be stretched to three times its length and ironed out into a smooth web; that is to say, in its crimped state, it is three times as heavy as the smooth web.

With a web of paper crimped by this method the crimped folds and grooves run transverse to the direction of travel. Although crimping of the web is indispensable, the fact that it runs transverse to the web complicates both the machines for the production of filters and the process employed therefor. As the filter cord is produced by the placing together of one or several paper strips of given width, which can only be done vertically to the crimped folds, strips of the aforesaid width must be cut off the broad crimped webs of paper so that these strips cannot be longer than the width of the crimped web. These strips are then fed to the gathering attachment of the filter plug machine in the longitudinal direction, i.e. parallel to the crimped folds.

In order to make continuous production possible, such longitudinally crimped paper strips of limited length are arranged side by side and slid continuously into the gathering attachment. Apart from the cutting and conveying devices thus required, which work intermittently and cause an increased susceptibility to breakdowns, the small length of strip provides a number of extremely troublesome shortcomings. In order to ensure that the successive strips are properly introduced into the gathering attachment, strips wider than 4 to 5 cm. cannot be used; this, as the material required is determined by the dimensions and thickness of the filter cord, makes it necessary to lay four to six crimped strips one on top of the other and to work them jointly in the gathering attachment, thus complicating the feeding apparatus still further. Since no other way of continuous manufacture has been known hitherto, extensive mechanical devices have been designed for the purpose and used in practice. It has also already been suggested to paste the separate crimped strips together by hand so as to permit continuous operation.

Apart from this feed difficulty, however, another drawback is that the first and last filter of every crimped strip of limited length have to be considered as rejects as both may contain the junction point between successive strips. This must be avoided since with the strips which are not pasted together part of the filter plug may easily drop out of the cigarette and with pasted strips the filtering effect is impaired by the pasted edge.

Thus there exists a need for new and improved crimped flat material for filter plugs.

The web of filtering material according to the invention is characterized by the fact that it is an endless web with a longitudinal structure parallel to its direction of travel, consisting of alternately thicker and less thick strip material.

A typical embodiment of the invention will now be described in detail in conjunction with FIGS. 1 to 13 of the attached drawing in which:

FIGS. 1 and 2 are a vertical and horizontal projection respectively of a typical embodiment of an arrangement for producing the crimped flat material according to the invention, shown diagrammatically;

FIGS. 3 to 10 are cross-sections and horizontal projections respectively, arranged in pairs; each pair is intended to indicate on an enlarged scale the appearance of the web of material at different points as it passes through the arrangement;

FIGS. 11 and 12 are each cross-sections through a stretched, corrugated web.

Figure 13:
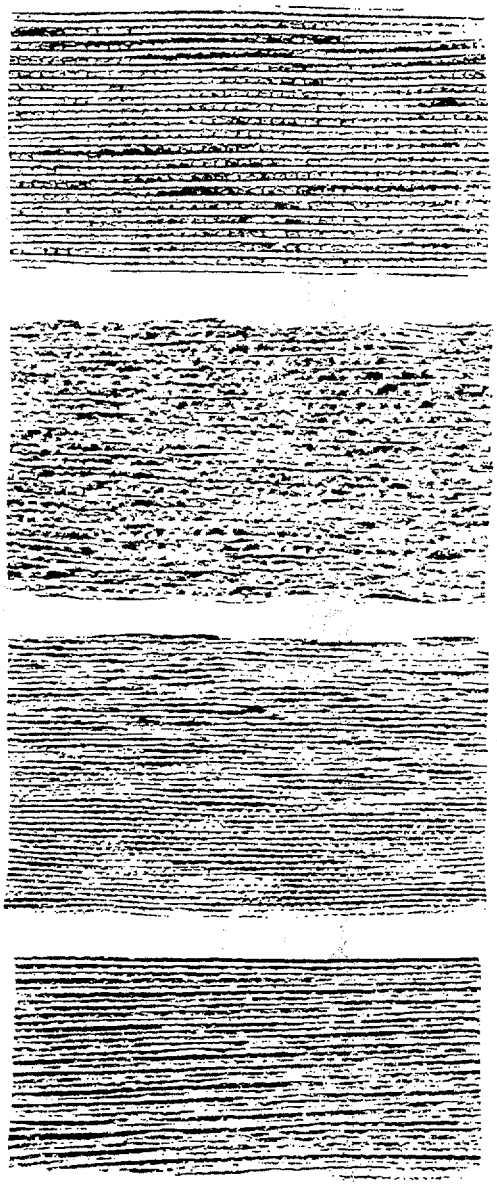
FIG. 13 shows a few samples of the material according to the invention.

The fundamental difference between the method of crimping flat material according to the invention and all previous crimping methods is that recognition, backed up by experience, is given to the fact that the crimping process, contrary to the existing assumption, does not necessarily result in a compression of the material per unit of length, but can also be achieved by stretching the structure of the material. This yields a web of material which, per unit of length is at the most equal in weight—even less heavy in most cases—to the smooth web of material. In spite of this, a substantial crimping ratio can be obtained, e.g. in the order of magnitude of 1:2, so that after the crimped web of material has been ironed smooth, it will have, per unit of length of the original web, dimensions which have become enlarged in the same ratio. Sections of equal area of the original web of material and of the crimped web which has been ironed smooth again will then be different in weight, the ironed web being lighter in proportion to the crimping ratio.

The crimping and stretching processes are advantageously, but not necessarily, carried out at the same time. Accordingly, the web of flat material to be treated must be previously made yielding, which can be done by spraying it with liquid, submitting it to steam treatment, heating it, passing it through a bath of liquid or in any other suitable manner depending on the type of material. This treatment, however, is carried out continuously on the web of material which is moved at a constant speed.

The flat material which has been made yielding, is subjected to a continuous process of crimping and stretching, for instance by means of suitable stamping devices, grooves, being produced such that two narrow zones of material are kept rigid along each groove and the central zone in between is deformed. Owing to the lateral zones being kept rigid, the central zone can only be deformed if the material in it is stretched at the same time. *This stretching process, of course, partially separates or pulls apart and consequently loosens the fibers of the material.* This process is carried out successively on a plurality of parallel grooves and yields a web of material whose surface has been enlarged at the expense of the thickness of the material at the point concerned. The differences in thickness transverse to the grooves of the web of material can result, as required, in thinner groove walls and thicker edges or, conversely, in thicker walls and thinner edges. (FIGS. 11 and 12).

If, by way of example, the web of material is grooved in its longitudinal direction, it will retain after the completed crimping and stretching process approximately the same width as before. If the web thus crimped is ironed smooth again, the resultant width of the web will be enlarged by the amount of the crimping ratio.

The stretching of the flat material depends primarily on the depth of the individual grooves and may be greater or less according to the type of material. If a web of material has to be more deeply grooved than is compatible with its stretching capacity, grooving is carried out in several successive stages, it being possible for the web of material to have a somewhat smaller width between each two stages. The final result will then be a crimped web of material which, although having the desired depth of groove, is less wide than the original smooth web; here, too, however, the surface is enlarged at the expense of the thickness of the material.

The crimped web of material generally requires an after-treatment, drying for instance, in order to reharden it *and set the grooves or corrugations therein*, and can then be divided up into narrow strips and wound on to magazine rolls or made up into filters immediately.

For certain purposes, for the production of webs of filtering material for instance, perforation of the flat material may be desirable. This is suitably done before the web of material has been made yielding or after it has been re-hardened with or without aftertreatment subsequent to the crimping and stretching process. For such webs of filtering material it may also be advantageous to interrupt the regular grooving of the crimped material, which can be done by means of a second grooving with the grooves running in a different direction. This cross grooving must of course also be effected when the material is still yielding. Finally, it should also be pointed out that for filtering purposes the material can be so vigorously stretched that randomly distributed tears, cracks and holes are produced in the crimped web.

FIGS. 1 and 2 illustrate a typical embodiment of an arrangement for producing endless webs of filtering material with longitudinal crimping, suitable for the efficient manufacture of filter plugs. In this arrangement the smooth web of material 1, made of absorbent paper for instance, runs from the delivery roll 2 through a perforator consisting of a toothed roller 3 and corresponding counter roller 4, or of other suitable perforating members. After passing through this perforator the web of material has ragged holes as shown in FIGS. 3 and 4. The perforated web then passes into a device 5, in which it is, for instance, moistened or treated with aqueous steam so as to give it the desired yieldingness. Furthermore, the tensile strength of the web of material must of course be great enough to ensure the faultness passage of the said material through the entire arrangement.

The web of material which has been made yielding and perforated is then deformed in a multi-stage crimping and stretching apparatus 6. Here it is assumed that stamping is effected by a number of pairs of rollers, the first of which is designated 7, 8 and the last 9, 10. In order to obtain a reduction in width, which is presumed to be desirable, the distance between the stamping edges of each successive pair of rollers is shortened. The same effect is achieved by increasing the speed of the roller pair 9, 10 in relation to that of the roller pair 7, 8. The reduction in width of the web of material will not necessarily be as large as indicated in FIGS. 1 and 2. Particularly when the material is vigorously stretched, the web width shown by dot-dash lines will result.

FIGS. 5, 6 illustrate the appearance of the web of material 1 after it has passed through the first pair of rollers 7, 8 and FIGS. 7 and 8 after it has passed through the last pair of rollers 9, 10. According to the configuration of the stamping rollers, the thickness of the material can be greater either at the groove edges, as shown in FIG. 11, or at the walls, as shown in FIG. 12.

After leaving the crimping and stretchng apparatus 6 the longitudinally corrugated and perforated web of material 1 passes through a pair of rollers 11, 12–pricking or knurled rollers, or others of suitable configuration—which deform the regular longitudinal crimped folds in an irregular manner so that the longitudinally corrugated web of material possesses a plurality of longitudinal grooves which run into one another, as indicated in FIGS. 9 and 10. Next, the web of material 1 passes into an aftertreatment apparatus, which here consists of a drying plate 13 with electric heating element 14. The longitudinally crimped web of material 1 can be easily damaged in its yielding state and must therefore not be pressed against the drying plate 13 by mechanical means. Instead, an air stream directed via the nozzles 15 against the web of material 1 is provided for the purpose. This air stream can, in its turn, be heated if desired or can also be used to cool the web of material 1.

Normally, a reduction in the width of the longitudinally crimped web of material occurs while the latter is being dried (not illustrated in FIGS. 1 and 2). If desired, this effect can be enhanced still further by gently compressing the web of material from the side, e.g. by means of lateral streams of compressed air ejected from special nozzles. The extent of the lateral contraction of the drying web also depends, of course, on the type of material, as well as on the changes in thickness caused by the stretching process, which changes are, in their turn, determined by the shape of the stamping grooves.

If desired, the hardened web of material 1 coming from the aftertreatment apparatus can pass through a second perforator consisting of the rollers 16, 17, in which case the first perforator 3, 4 may possibly be omitted. The web of material 1, which has thus received its final form, is now subdivided by rotating cutter blocks 18, 19 into three strips 1a, 1b, 1c which are wound on to magazine spools 20, 21, 22.

The arrangement shown in FIGS. 1 and 2 can be substantially simplified, according to the type of the web of material to be worked and the purpose intended for the strip filtering material produced. By way of example, the perforators 3, 4 and 16, 17 can be completely dispensed with, particularly if randomly distributed cracks and holes are produced by adequately vigorous stretching of the material. Furthermore, grooving with only one pair of stamping rollers 7, 8 already yields a perfectly usable, longitudinally corrugated web of material, the width of the original smooth web remaining virtually unchanged. In this case, to be sure, it is advisable to employ a fine-knurled pair of rollers 11, 12 so as to avoid through longitudinal ducts.

FIG. 13 shows a photograph of four samples of material, A, B, C and D which were produced with an arrangement of the type described above and having only one pair of stamping rollers. With all four samples crimping was effected in the same manner; with samples A and B, however, perforation was effected before or after the crimping and stretching process respectively, but treatment with a knurled roller was dispensed with. C and D are samples of a crimped and stretched web of material subsequently treated with a coarse or fine knurled roller respectively. In all cases the longitudinal grooving is clearly visible, the material here—a thin blotting paper—being so vigorously stretched that large cracks occur, which greatly facilitates the gathering of the webs of material, which is done transverse to the longitudinal direction of the grooves, and yields highly effective filter cords. In addition, the longitudinal structure consisting of an alternately larger and smaller material thickness transverse to the longitudinal direction of the groove is clearly recognizable.

Having now particularly described and ascertained the nature of my said invention and in what manner the same is to be performed, I declare that what I claim is:

1. As an article of manufacture, an absorbent sheet for making filters for cigarettes, comprising a web of an elongated fibrous strip material having a plurality of parallel adjacent strips of alternately greater and lesser density of said strip material extending substantially parallel to the longitudinal dimension of said web and having superposed thereonto crimping grooves, the crimping ratio, taken transversely to the direction of the grooves, of a strip when in crimped condition to a crimped strip when ironed flat being in the range of 1:1 to 1:2, said strips being provided with a plurality of spaced cracks therein running substantially in the direction of said grooves.

2. As an article of manufacture, an absorbent sheet for making filters for cigarettes, comprising an elongated web of fibrous strip material having a plurality of parallel adjacent strips of alternately greater and lesser density of said material, said strips extending substantially parallel to the longitudinal dimension of said web and having superposed thereonto crimping grooves, said strips each being provided with a plurality of cracks therein at spaced locations and running substantially in the direction of said grooves, the weight ratio of a portion of predetermined area of a strip when in crimped condition to a portion of like area of a crimped strip when ironed flat being in the range of 1:1 to 2:1.

3. As an article of manufacture, an absorbent sheet for making filters comprising, a web of elongated fibrous strip material having a plurality of parallel adjacent strips of alternately greater and lesser density of said material, said strips extending substantially parallel to the longitudinal dimension of said web and having superposed thereonto crimping grooves extending substantially parallel to said strips, said strips at the upper and lower edges of said crimping grooves being thicker than at the walls of said grooves intermediate said edges, said strips being provided with a plurality of spaced cracks therein running substantially in the direction of said grooves.

4. As an article of manufacture, an absorbent sheet for making cigarette filters comprising, a web of elongated fibrous strip material having a plurality of parallel adjacent strips of greater and lesser density of said material, said strips extending substantially parallel to the longitudinal dimension of said web and having superposed thereonto crimping grooves, all of said strips being provided with a plurality of perforations running substantially in the direction of said grooves and having ragged borders.

5. An absorbent sheet for making cigarette filters comprising an elongated web of fibrous sheet material having closely spaced longitudinal crimping grooves set therein, having, for each groove and substantially parallel thereto, a plurality of adjacent strips of alternately greater and lesser density of the sheet material, and also having throughout the extent of said web a plurality of randomly distributed interrupted longitudinal tears produced by a lateral stretching of said web beyond its elastic limit during formation of said grooves.

*6. A filter for tobacco smoke comprising a wrapper and a filling therein, said filling consisting essentially of contacting layers of paper strip material having longitudinally extending connected loops including ridge portions, said ridge portions being at least in part compressed, the fibers of said strip material being at least partly pulled apart laterally of said material, the adjacent ridges being*

*faced in opposite directions and having projecting fiber ends on the outer surface thereof, and said strip material being consolidated to substantially cylindrical form and being readily permeable longitudinally to gases.*

*7. Elongated strip of fibrous cellulosic material, particularly adapted for the formation of filters for tobacco smoke, consisting essentially of paper strip having connected ridges extending longitudinally thereof, the fibers of said strip being at least partly pulled apart laterally of said strip, the adjacent ridges being faced in opposite directions and having projecting fiber ends on the outer surface thereof, said ridges being at least in part compressed.*

*8. A grooved paper sheet adapted for use as a tobacco smoke filter, said sheet being provided with substantially parallel grooves including ridge portions, the fibers of said sheet being at least partly pulled apart laterally of said grooves, said ridge portions being at least in part compressed and having fiber ends projecting from the surfaces thereof in haphazard manner, said grooves being loosely pervaded by said fiber ends.*

*9. A filter for tobacco smoke comprising a wrapper and a filling therein, said filling consisting essentially of contacting layers of paper strip material having generally longitudinally extending connected loops including ridge portions, said ridge portions being at least in part compressed, the fibers of said strip material being at least partly pulled apart laterally of said material, the adjacent ridges facing in opposite directions and having projecting fiber ends on the outer surface thereof, and said strip being consolidated to rod form characterized by generally longitudinal passageways in said loops and between said layers, most of said passageways being pervaded with projecting fiber ends.*

*10. Elongated strip of fibrous cellulosic material, particularly adapted for the formation of filters for tobacco smoke, consisting essentially of paper strip provided with closely-spaced longitudinal grooves including ridge portions, said ridge portions being at least in part compressed and having fiber ends projecting from the surfaces thereof in haphazard manner, said grooves being loosely pervaded by said fiber ends, and said grooves being deformed in an irregular manner so that some of said grooves run into one another.*

*11. An absorbent sheet adapted to be gathered and shaped to make a filter plug for cigarettes comprising an elongated web of paper strip material having set therein, throughout the area thereof, closely-spaced corrugations extending generally longitudinally of said web, said web being stretched laterally and the fibers of said strip material being at least partially pulled apart laterally of said web to an extent sufficient to provide throughout the extent of said web a plurality of randomly-distributed discontinuous longitudinal tears.*

*12. A filter for cigarettes comprising a consolidated filling having the shape of a cylindrical plug, said filling consisting essentially of paper strip material provided with closely-spaced longitudinal corrugations set therein, throughout the area thereof, prior to consolidation of said filling, said paper strip material being stretched transversely and the fibers of said paper strip material being at least partially pulled apart transversely of said material to an extent sufficient to provide throughout the extent of said material a plurality of randomly-distributed discontinuous longitudinal tears, said material having lateral gathers disposed close to each other in compressed relation and arranged as adjacent layers whereby said consolidated filling has generally longitudinal passageways along said corrugations and between said layers, and said passageways are generally laterally connected through said tears.*

* * * * *